United States Patent [19]

Gibson

[11] 4,376,607
[45] Mar. 15, 1983

[54] BALE HANDLING APPARATUS

[76] Inventor: David W. Gibson, Box 117, Springdale, Mont. 59082

[21] Appl. No.: 287,285

[22] Filed: Jul. 27, 1981

[51] Int. Cl.$^3$ .............................................. A01D 87/12
[52] U.S. Cl. ................................ 414/24.6; 241/101.7; 414/111; 414/501; 414/911
[58] Field of Search .................... 414/24.5, 24.6, 111, 414/501, 502, 518, 684, 911; 241/101 A, 101.7; 242/86.5 R, 86.52; 198/406

[56] References Cited

U.S. PATENT DOCUMENTS

| 3,853,229 | 12/1974 | Dougherty et al. | 414/111 |
|---|---|---|---|
| 3,874,609 | 4/1975 | Larson | 414/24.6 |
| 3,963,138 | 6/1976 | Fowler | 414/502 |
| 4,044,967 | 8/1977 | Guichon | 414/24.6 |
| 4,053,071 | 10/1977 | Schrag et al. | 414/24.5 X |
| 4,068,804 | 1/1978 | Butler et al. | 241/101.7 |
| 4,101,081 | 7/1978 | Ritter et al. | 414/502 |
| 4,170,426 | 10/1979 | White et al. | 414/518 X |

FOREIGN PATENT DOCUMENTS 2048211 12/1980 United Kingdom ............... 414/24.6

Primary Examiner—Leslie J. Paperner
Attorney, Agent, or Firm—Arthur L. Urban

[57] ABSTRACT

Bale handling apparatus including a base portion, a bale moving portion, a bale distributing portion and a control portion; the base portion including a frame section, a wheeled carriage supporting the frame section, a hitch member disposed at one end of the frame section, a ramp section having a lower receiving end and an upper discharge end, the lower end of the ramp section being adjacent the end of the frame section remote from the hitch member, the ramp section extending upwardly from the end of the frame section toward the hitch member a distance more than one-half the length of the base portion, a closure located adjacent the lower end of the ramp section, a retainer associated with the longitudinal edges of the ramp section; the bale moving portion including conveying mechanism disposed longitudinally of the ramp section and between the longitudinal edges thereof; the bale distributing portion being disposed on the base portion adjacent the raised end of the ramp section, the bale distributing portion including a frame section, bale rotating mechanism extending between members of the frame section, the bale rotating mechanism being oriented transversely of the conveying mechanism, the bale distributing portion including a generally horizontal bale supporting surface, the bale supporting surface being disposed below the upper end of the ramp section, a retainer associated with portions of the periphery of the frame section remote from the ramp section; the control portion including mechanism for driving the conveying mechanism and the bale rotating mechanism.

10 Claims, 4 Drawing Figures

BALE HANDLING APPARATUS

This invention relates to a novel bale handling apparatus and more particularly relates to a new apparatus for handling large bales of forage material.

Many years ago, cut hay and other forage crops were gathered into stacks for storage prior to use as animal feed. While this method was satisfactory when farm labor was readily available and cheap, difficulties in obtaining farm laborers and the high cost of such labor have seen the demise of loose haystacks in recent years.

A variety of solutions have been proposed for reducing the amount of labor required for gathering and storing hay. These proposals frequently have involved the mechanical compression of hay into bales of one shape or another. The use of this type of machinery for baling hay has resulted in a significant reduction in the hand labor previously required for such operations.

Hay often is baled into rectangular bales having a size of about one foot by one and one-half feet by three feet. These bales then are stacked in crossed layers with the bales in one layer having their long dimension at right angles to the long dimension of bales in adjacent layers. Although machinery has been developed to stack rectangular bales, most farmers and ranchers still utilize considerable hand labor with such small bales to achieve the desired tight straight stacking of the bales.

With the continuing increasing difficulties in obtaining and paying for farm labor, there have been further efforts to develop hay handling methods that can achieve additional reductions in the amount of hand labor required for such operations. One proposal that has received a considerable degree of acceptance has been the baling of hay into large round bales. These bales may be as large as six feet or more in diameter and weigh more than 1,000 pounds.

Round bales have a number of significant advantages over conventional small rectangular bales. Round bales can be gathered from the field and stacked easily by one person with a tractor. A tractor can be equipped with a spear-like projection or a fork lift attachment and the bale lifted off the ground and moved to a desired position. Since a half ton or more of hay can be handled in one simple operation, a large quantity of hay can be gathered and stacked in a very short time by a single tractor operator.

While methods such as described above have been developed which greatly reduce the amount of hand labor involved in gathering and storing hay, the subsequent use of and feeding of such hay still often involves considerable hand labor. Usually with small rectangular bales, the bales are removed from the stack individually by hand and transferred to the feeding site in a truck or trailer. At the feeding site, each bale is opened by cutting the twine and the hay distributed over the ground.

In feeding animals from the large round bales, the hay may be distributed from the bale by hand or by one of the presently offered tractor accessories. Feeding by hand involves carrying a bale to the field with a tractor, stopping the tractor periodically and getting off to remove and distribute some of the hay by hand.

The commercially available mechanical round bale feeders ordinarily require that the bales be handled one at a time. After a bale has been distributed in the field, the driver must return to the hay storage area, pick up another bale and then drive back to the field to resume the distributing operation. This repeated returning to the hay storage area can waste considerable time and fuel.

The present invention provides a novel bale handling apparatus which simplifies the distribution of hay and other forage from large round bales. The bale handling apparatus of the invention provides a convenient means for achieving uniform distribution of hay quickly and with a minimum of time and fuel. The bale handling apparatus permits a single person driving a tractor to distribute hay from a large number of bales in a short period of time.

The bale handling apparatus of the present invention is simple in design and relatively inexpensive to manufacture. The bale handling apparatus can be fabricated from commercially available materials and components. Conventional farm equipment manufacturing techniques and procedures can be utilized in the fabrication of the apparatus.

The bale handling apparatus is suitable for use under a wide variety of conditions. The apparatus can be installed on a tractor easily in only a few minutes and can be removed as easily when not needed. The feeding apparatus is durable in construction and has a long useful life with little maintenance.

Other benefits and advantages of the novel bale handling apparatus of the present invention will be apparent from the following description and the accompanying drawings in which.

Figure 1:
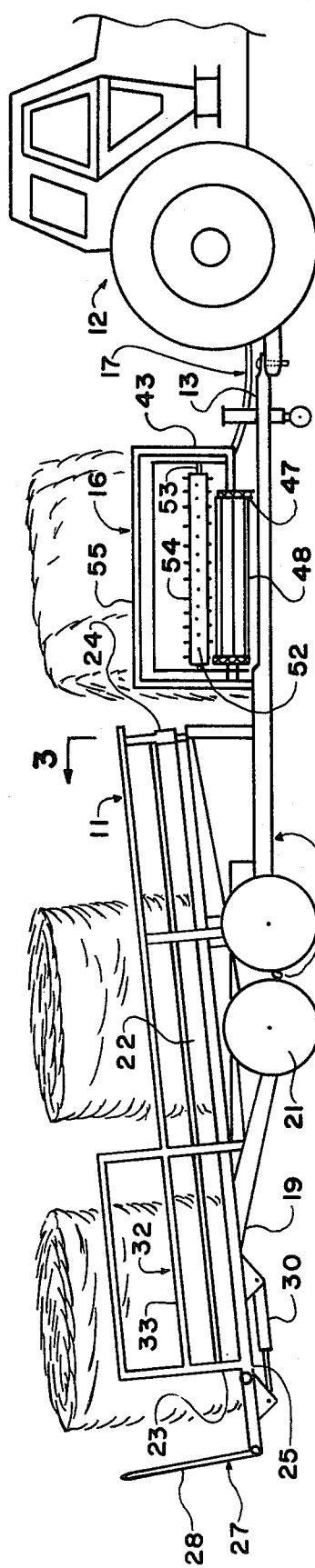
FIG. 1 is a side elevation of one form of the bale handling apparatus of the invention attached to a tractor.
Figure 3:
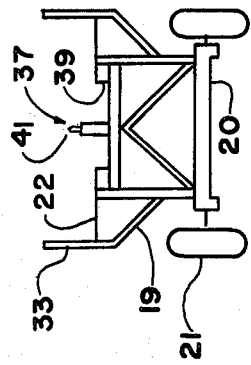
FIG. 3 is a sectional view taken along line 3—3 of FIG. 1.
Figure 4:
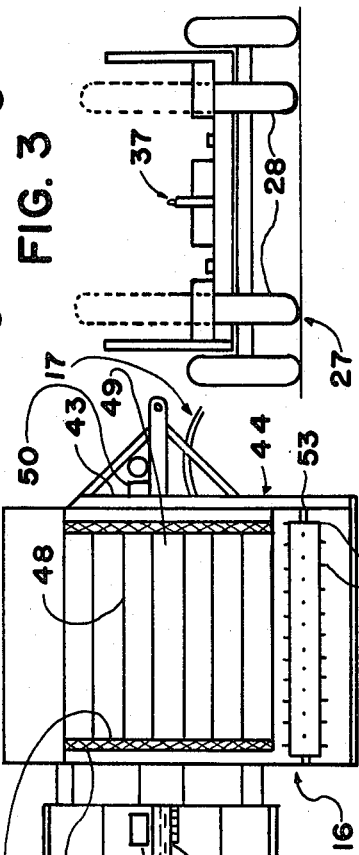
FIG. 4 is a left end view of the bale handling apparatus shown in FIGS. 1 and 2.
Figure 2:
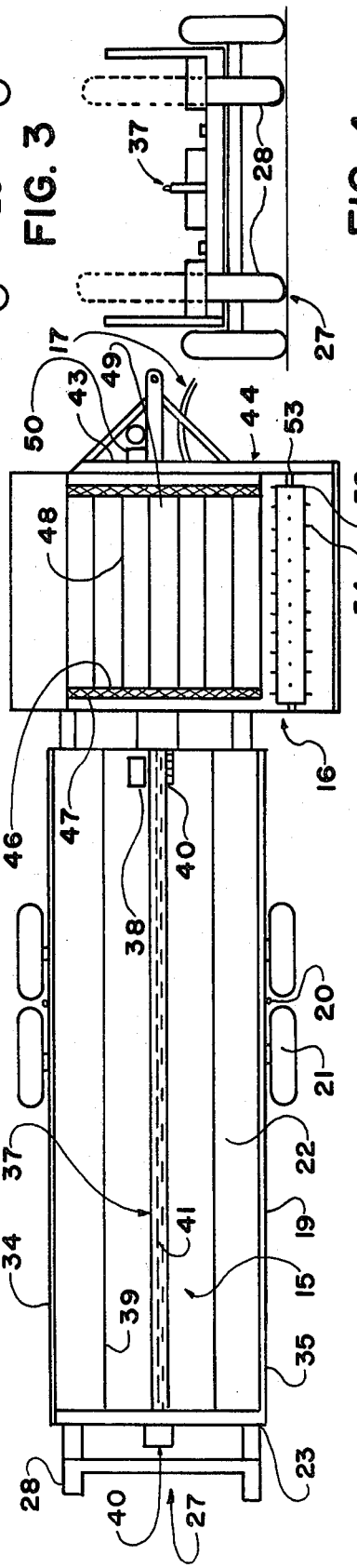
FIG. 2 is a top view of the bale handling apparatus shown in FIG. 1.

As shown in the drawings, one form of the novel bale handling apparatus 11 of the present invention is attached to a tractor 12 through a hitch member 13. The apparatus 11 includes a base portion 14, a bale moving portion 15, a bale distributing portion 16 and a control portion 17.

Base portion 14 includes a frame section 19 supported on carriage means 20 including wheels 21. Hitch member 13 is disposed at one end of the base portion 14. The frame section 19 includes a ramp action 22 having a lower receiving end 23 and an upper discharge end 24. The lower end 23 of the ramp section 22 is disposed adjacent the end 25 of the frame section 19 opposite or remote from the hitch member 13. The ramp section 22 extends upwardly from the end 25 of the frame section 19 toward the hitch member 13 a distance more than one-half the length of the base portion 14. Advantageously, the ramp section 22 and the bale distributing portion 16 extend substantially the full length of the base portion 14.

Closure means 27 are located adjacent the lower end 23 of the ramp section 22. The closure means 27 advantageously may be of a fork configuration with fingers 28 to facilitate loading of bales. Also, the closure means 27 preferably includes means for moving the closure from an open to a closed position such as hydraulic cylinder 30 attached to frame section 19. Advantageously, retaining means 32 including raised guard means 33 is associated with the longitudinal edges 34 and 35 of the ramp section 22.

The bale moving portion 15 includes conveying means 37 disposed longitudinally of the ramp section 22 between the longitudinal edges 34 and 35 thereof. The conveying means 37 includes driving means such as hydraulic motor 38. Advantageously, the conveying means 37 is disposed along an open channel 39 in the ramp section 22.

The conveying means 37 preferably includes endless flexible conveying means such as an endless chain carried by sprockets 40. The chain may include raised finger members 41 to facilitate movement of the bales along the ramp section 22.

The bale distributing portion 16 is disposed adjacent the upper end 24 of the ramp section 22, that is, between the end of the ramp section and the hitch member 13. The bale distributing portion 16 includes a frame section 43. Also, the bale distributing portion 16 includes bale rotating means 44 extending between members of the frame section 43. The bale rotating means 44 as shown includes endless chains 46 mounted on sprockets 47. The bale rotating means 44 is oriented transversely of conveying means 37. Extending between the chains are angle members 48 which pass above and below supporting surface 49. The assembly is driven by a power source such as hydraulic motor 50.

Associated with the discharge end of the bale rotating means 44 is a roller 52 mounted on shaft 53. Roller 52 which also is driven by motor 50 advantageously includes a plurality of fingers 54 on the peripheral surface thereof.

The bale supporting surface 49 is disposed below the upper end 24 of the ramp section 22. Advantageously, the support surface 49 is disposed at a level between the upper end 24 and the lower end 23 of the ramp section 22. The distributing means 16 further includes retaining means shown as guard rails 55.

In the use of the bale handling apparatus 11 of the present invention, the apparatus first is attached to a tractor 12 through hitch member 13. The tractor then is driven to a hay storage area to load the bales. Large round bales are loaded onto the apparatus 11 by lowering the closure 27 and backing the apparatus into a position in which the fingers 28 of the closure slide under a bale. Cylinder 30 is activated to raise closure 27 and cause the bale to be tipped on end onto the lower end 23 of ramp section 22. Next, motor 38 is actuated to move conveyor 37 and advance the bale partway up the ramp section 22.

The procedure is repeated to load additional bales onto the ramp section 22 of the apparatus 11. As each bale is loaded, the bales previously loaded advance up the ramp section 22 until the ramp is full.

When the ramp is full, the uppermost bale is transferred to the bale distributing portion 16. This transfer is effected by advancing the upper bale off the ramp section 22. Since the bale supporting surface 49 is located lower than the upper end 24 of the ramp section, the bale being discharged from the ramp will be tipped into the distributing portion 16 in a position with its axis oriented horizontally. The apparatus is now loaded fully for feeding.

The apparatus 11 with the bales loaded thereon is towed to the feeding site with the tractor 12. Upon reaching the desired location, control portion 17 is activated to start motor 50. Motor 50 drives chains 46 of bale rotating means 44. This action causes the bale to rotate on supporting surface 49. During this rotation, the periphery of the bale contacts rotating roller 52.

The fingers 54 of the roller 52 separate a layer of hay from the bale and transfer it to the ground adjacent to the side of the apparatus in a continuous ribbon. While this is happening, the tractor 12 can be driven forward to distribute the ribbon along the path of the apparatus being towed by the tractor.

The above description and the accompanying drawings show that the present invention provides a novel bale handling apparatus which simplifies the distribution of forage material from large round bales. The bale handling apparatus of the invention enables one person driving a tractor or other vehicle to distribute a large number of bales in a short period of time. The apparatus provides a novel means for distributing hay or other forage material with a minimum of time and fuel.

The bale handling apparatus of the present invention is adaptable for use under a variety of different conditions. The apparatus can be installed on a tractor in only a few minutes and can be removed as easily when the apparatus is not needed.

The bale feeding apparatus is simple in design and relatively inexpensive to manufacture. The apparatus is durable in construction and has a long useful life with little maintenance. The bale feeding apparatus can be fabricated from commercially available materials and components using conventional farm equipment manufacturing techniques and procedures.

It will be apparent that various modifications can be made in the particular bale handling apparatus described in detail and shown in the drawings within the scope of the invention. The size, configuration and arrangement of components can be changed to meet specific requirements. Also, the control portion can be different to facilitate operation of the apparatus with particular vehicles. These and other changes can be made in the bale handling apparatus of the invention provided the functioning and operation of the apparatus is not deleteriously affected. Therefore, the scope of the invention is to be limited only by the following claims.

What is claimed is:

1. Bale handling apparatus including a base portion, a bale moving portion, a bale distributing portion and a control portion; said base portion including a frame section, wheeled carriage means supporting said frame section, a hitch member disposed at one end of said frame section, a ramp section having a lower receiving end and an upper discharge end, said lower end of said ramp section being adjacent the end of said frame section remote from said hitch member, said ramp section extending upwardly from said end of said frame section toward said hitch member a distance more than one-half the length of said base portion, closure means located adjacent the lower end of said ramp section, retaining means associated with the longitudinal edges of said ramp section; said bale moving portion including conveying means disposed longitudinally of said ramp section and between the longitudinal edges thereof; said bale distributing portion being disposed on said base portion adjacent the raised end of said ramp section, said bale distributing portion including a frame section, bale rotating means extending between members of said frame section, said bale rotating means being oriented transversely of said conveying means, said bale distributing portion including a generally horizontal bale supporting surface, said bale supporting surface being disposed below the upper end of said ramp section, retaining means associated with portions of the periphery of said frame section remote from said ramp section; said control portion including means for driving said conveying means and said bale rotating means; whereby bales positioned on said ramp section of said apparatus are advanced up said ramp section and discharged onto said support surface of said bale distributing portion where each is rotated by said bale rotating means to distribute material therefrom as said apparatus is moved over a field.

2. Bale handling apparatus according to claim 1 wherein said conveying means is disposed along an open central channel of said ramp section.

3. Bale handling apparatus according to claim 1 wherein said conveying means includes bale engaging means.

4. Bale handling apparatus according to claim 1 wherein said conveying means includes endless flexible conveying means.

5. Bale handling apparatus according to claim 1 wherein said conveying means includes endless chain means with raised finger members.

6. Bale handling apparatus according to claim 1 wherein said bale rotating means includes second conveying means.

7. Bale handling apparatus according to claim 1 wherein said bale rotating means includes roller means.

8. Bale handling apparatus according to claim 1 wherein said bale supporting surface is disposed at a level between said upper end and said lower end of said ramp section.

9. Bale handling apparatus according to claim 1 wherein said retaining means of said base portion and said bale distributing portion include raised guard means.

10. Bale handling apparatus according to claim 1 wherein said control means includes a plurality of hydraulic drive means.

* * * * *